United States Patent [19]

Scheps

[11] Patent Number: 5,249,196
[45] Date of Patent: Sep. 28, 1993

[54] INTERNALLY FOLDED SCALABLE LASER

[75] Inventor: Richard Scheps, Del Mar, Calif.

[73] Assignee: The United States of America as represented by the Secretary of the Navy, Washington, D.C.

[21] Appl. No.: 887,202

[22] Filed: May 21, 1992

[51] Int. Cl.$^5$ ............................................. H01S 3/081
[52] U.S. Cl. .................................. 372/93; 372/66;
372/10; 372/108; 372/69; 372/33; 372/19;
359/313; 359/286
[58] Field of Search ................................ 372/92-95,
372/66, 10, 69, 108, 33, 19; 359/313, 286

[56] References Cited

U.S. PATENT DOCUMENTS

| | | | |
|---|---|---|---|
| 3,764,196 | 10/1973 | Dean et al. | 359/313 |
| 4,578,793 | 3/1986 | Kane et al. | 372/94 |
| 4,955,034 | 9/1990 | Scerbak | 372/93 |
| 5,052,815 | 10/1991 | Nightingale | 372/94 |
| 5,177,764 | 1/1993 | Nilsson | 372/66 |

*Primary Examiner*—Léon Scott, Jr.
*Attorney, Agent, or Firm*—Harvey Fendelman; Thomas Glenn Keough

[57] ABSTRACT

An internally folded scalable laser has a gain medium with an internal face and an external face and at least one internal-fold face subtending an angle which may be about 90°. An output coupler that is partially reflective of the resonator mode is oriented to receive and reflect resonator mode in a direction normal to the internal face to avoid resonator mode astigmatism and to define a folded hemispherically-shaped resonator cavity extending from the output coupler and through an active volume in the gain medium to the external face. A pumping mode source disposed adjacent to the external face is oriented to focus a first pumping mode in a direction normal to the external face in a boom waist at or inside the external face in the folded resonator cavity to define an active volume in the gain medium and to avoid pumping mode astigmatism. Other pumping mode sources direct more pumping mode through the internal-fold faces into portion of the active volume to partially or completely overlap the pumping and resonator modes. Simultaneously pumping the gain medium along more than one axis for each fold surface assures scaling and physical separation of the pumped regions reduces thermal lensing problems. Other angles between the external and internal faces could be formed in multifaceted configurations of the gain medium so long as the pumping mode beam is normal to the external face and the resonator mode beam is normal to the internal face.

41 Claims, 4 Drawing Sheets

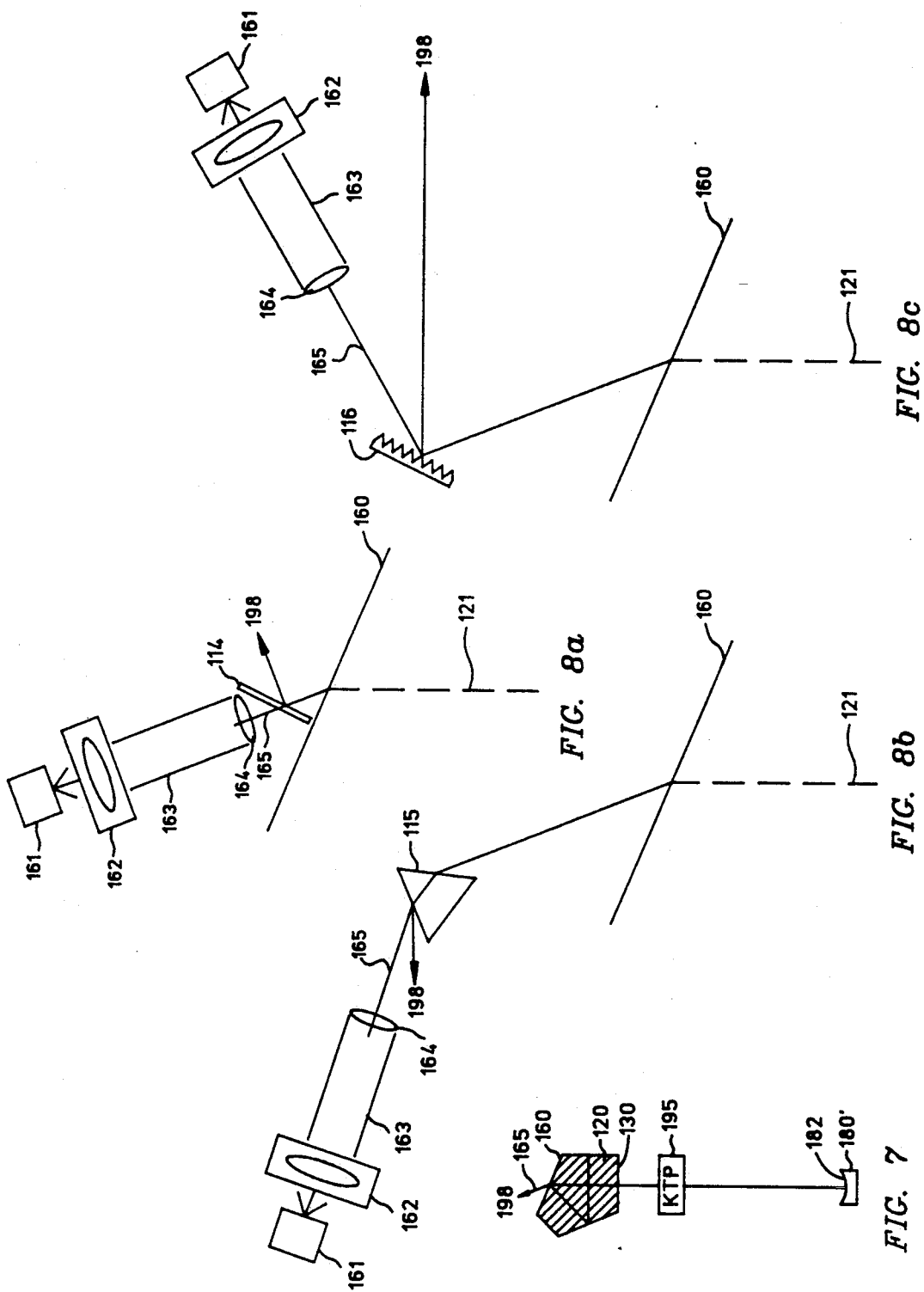

INTERNALLY FOLDED SCALABLE LASER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Over the years numerous modifications in diode-pumped laser design have been made to increase performance in terms of the output power. Recently, the trend in longitudinal or end pumping of the active gain medium has been to provide for greater output power as compared to earlier pump configurations; however, excessive pumping levels in any orientation might create the problems associated with heating of the gain medium. Longitudinal pumping of Nd:YAG lasers by laser diodes is generally preferred over transverse pumping for efficient $TEM_{00}$ operation owing to the overlap of the resonator mode with the inversion profile produced by the pump beam. A limiting factor is that the scaling of longitudinally pumped lasers has been constrained by the power available from single stripe diodes. Current technology limits the maximum pump power along a single axis to about 6 W by polarization combination of two 3 W laser diodes. Recent developments in scaling have attempted to address the problem of providing higher longitudinal pump power and have included techniques that, 1.) utilize incoherent arrays for longitudinal pumping, see S. C. Tidwell et al.'s "Scaling Output Power of End-Pumped Solid-State Lasers", *Conference on Lasers and Electro-Optics, Paper CFC*1, May 17, 1991, Baltimore, 2.) have resonator designs that allow pumping simultaneously along two axes, see R. Scheps et al.'s "Scalable Single Frequency Diode-Pumped Ring Laser", *Appl. Opt.*, Vol 31, No. 9, Mar. 20, 1992, pp 1221–1224, 3.) have zig-zag slab lasers pumped with linear arrays, see D. Krebs' "Diode-Pumped Slab Laser Study", *McDonnell Douglas Technical Report N66001-83-C-0071* (April, 1986); and T. M. Baer et al.'s "High Peak Power Q-switched Nd:YLF Laser Using a Tightly Folded Resonator", *Conference on Lasers and Electro-Optics, Paper CMF*2, May 21, 1990, Anaheim, and 4.) have resonators containing multiple gain elements, see R. Scheps et al.'s "A Single Frequency Nd:YAG Ring Laser Pumped by Laser Diodes", *IEEE Quantum Electron*, vol. 26 (1990), pp. 413–416. Additional scaling developments have been based on combining the output of several laser diodes to form a single pump beam, see R. Scheps et al.'s "Alexandrite Laser Pumped by Semiconductor Lasers", *Appl. Phys. Lett*, vol. 56 (1990), pp. 2288–2290 and T. Y. Fan et al.'s "Scalable, End-Pump, Diode-Laser-Pumped Laser", *Opt. Lett*, vol. 14 (1989), pp. 1057–1059.

While these approaches to scaling are promising, the need for a simple resonator capable of producing several Watts of $TEM_{00}$ power has led to a search for alternative designs. A straightforward concept based on a folded hemispherical resonator, such as that mentioned in the article "Highly Efficient Neodymium: Yttrium Aluminum Garnet Laser End Pumped by a Semiconductor Laser Array" by D. L. Sipes in *Appl. Phys. Lett.*, Vol. 47 (1985), pp. 74–76, can accommodate two pump axes and hence allows for a doubling of the pump power. The term "folded resonator" in general refers to a laser resonator where all the internal components do not lie in a single straight optical axis. Instead, there is a discrete flat "fold" mirror in the resonator that reflects the resonator radiation along a second linear optical axis, usually oriented 90° with respect to the first linear optical axis. In such a device the pump radiation incident on the interior face of the laser crystal typically penetrates the fold mirror, but in practice pumping through the fold mirror requires a long focal length lens. Consequently, too large a pump waist is produced at the rod which results in reduced efficiency.

Another recent design is the zig-zag slab laser configuration such as that disclosed in U.S. Pat. No. 4,785,459. A confocal resonator design is transversely pumped and bounces a resonator mode beam in a zig-zag path from side to side of a slab gain medium. The gain medium should have its sides perfectly parallel and is said to be polished to about $\lambda/2$. At each bounce point a stripe of a multistripe laser bar is precisely located and positioned to hopefully provide a cumulative pumping power without introducing unwanted influences to thereby enhance the laser output. The resonator mode size throughout the zig-zag configuration is said to be about 200 microns. Fabrication of the slab appears to be complicated and, as a consequence, may be expensive.

Thus, a continuing need exists in the state of the art for a simple compact laser design that can be longitudinally pumped to provide several watts of CW output power. Such a design is one that employs a multifaceted gain medium that internally folds a hemispherically-shaped resonator mode radiation. At each internal fold face, the gain medium may be optically pumped by a number of pumping mode radiations emitted from a plurality of appropriately oriented pumping mode sources to allow increased pumping levels and increased laser output.

SUMMARY OF THE INVENTION

The present invention is directed to providing an internally folded scalable laser. A gain medium has an external face and an internal face oriented orthogonal to each other and at least one internal-fold face subtending a 90° angle between the external orthogonal face and the internal orthogonal face. The internal orthogonal face is antireflective to resonator mode radiation. The external orthogonal face and the at least one internal-fold face are highly reflective to resonator mode radiation and highly transmissive to pumping mode radiation at the appropriate internal and external angles of incidence. An output coupler is partially reflective of the resonator mode radiation and is spaced and oriented with respect to the internal orthogonal face to receive and reflect resonator mode radiation in a direction normal to the internal orthogonal face to define a folded resonator cavity that extends from the output coupler and through an active volume in the gain medium to the external orthogonal face. The resonator mode radiation is in a direction normal to the internal orthogonal face to avoid resonator mode astigmatism. A first of a plurality of pumping mode radiation sources is disposed adjacent the external orthogonal face and is oriented to focus a first pumping mode radiation in a direction normal to the external orthogonal face in a waist in the gain medium at or inside the external orthogonal face in the folded resonator cavity to define an active volume. The first pumping mode radiation is in a direction normal to the external orthogonal face to avoid pumping mode astigmatism and overlaps the resonator mode inside the gain medium. At least one other of the plurality of pumping mode radiation sources is oriented to direct other pumping mode radiation through the internal-fold face into a portion of the active volume in the gain medium to at least partially overlap the pumping mode and the resonator mode radiations.

An object of the invention is to provide an internally folded scalable laser.

An object of the invention is to provide an improved folded scalable laser by using internal fold mirrors.

An object of the invention is to provide an internally folded scalable laser having a hemispherical resonator for providing high efficiency with reduced threshold power for end pumping.

An object of the invention is to provide an internally folded laser providing a compact as well as efficient laser scalable in output power without increasing the size of the gain element.

An object of the invention is to provide an internally folded laser providing a compact as well as efficient scalable laser achieved by reflecting the resonator mode over itself a plurality of times without increasing the size of the gain medium.

Another object is to provide an internally folded scalable laser in which the gain medium is shaped with a plurality of faces to internally reflect resonator mode radiation which is overlapped by pumping mode radiation entering the gain medium through an internal fold face.

Another object is to provide an internally folded scalable laser shaped with faces for overlapping pumping mode radiation from a plurality of pumping sources with resonator mode radiation of the gain medium to increase output levels.

Another object of the invention is to provide an internally folded multifaceted scalable laser having non-parallel faces for internally reflecting overlapping pumping mode radiation and resonator mode emissions for increased output levels at reduced cost.

Another object of the invention is to provide an improved internally folded scalable laser having a plurality of sources of pumping mode beams properly oriented to substantially overlap with the resonator mode.

Another object of the invention is to provide a laser design employing a multi-faceted gain medium that internally overlaps a folded hemispherically shaped resonator mode radiation by a number of pumping mode radiations emitted from a plurality of appropriately oriented pumping mode sources.

Another object of the invention is to provide a laser design employing a multi-faceted gain medium providing a polarized output.

Another object of the invention is to provide a laser design employing a multi-faceted gain medium providing for an improved green output.

Another object of the invention is to provide an improved folded scalable laser amplifier using internal fold mirrors.

An advantage of this invention is that it can be scaled to higher power than the standard end-pumped geometry without sacrificing slope efficiency, or increasing the pump threshold, or operating in modes higher than the TEM$_{00}$ mode.

Another advantage of this invention is that there is no resonator mode astigmatism since the resonator mode exits and enters the gain element normal to the internal face.

Another advantage of this invention is that there is polarization of the output beam which is a natural outgrowth of the manner in which the gain element is fabricated to provide that the second harmonic generation is more efficient and less prone to noise spikes.

Another advantage of this invention is that there is scaling to very high power since a large number of internal fold faces can be designed into the gain element and a large number of pump diodes can be used to pump the laser.

Another advantage of this invention is that the laser resonator can be made highly compact since the resonator mode can cross over itself many times within the gain element, independent of the large number of pump axes.

Another advantage of this invention is that thermal effects are greatly reduced because pump beams are physically separated to create multiple pump volume paths for thermal cooling and convection through the crystal rather than putting more and more pump power into a single pump volume.

Another advantage of this invention is that complete overlap of pump and resonator beams may occur for all pump beams in the gain element with the exception of the right angle prism in Nd:YAG or other high index material.

Another advantage of this invention is that each bounce point or internal fold gives the option of two additional discrete pump axes so that, at the present time, each axis can be pumped with 6 Watts of pump light, so each pump face provides the option for 12 Watts of pump power.

An advantage of this invention is that a bidirectional generation of green light can be provided to emit from the laser in a single output beam to allow for up to twice as much green light.

A feature of this invention is that it has at least one internal-fold face which is a flat face of the gain element which is used to reflect the resonator mode back into the gain element, exclusive of the external face.

Another feature of this invention is that one end of the resonator is formed by a properly coated face of the gain element and that the resonator mode is incident upon this face at 0° (normal incidence) and comes to a waist at this face.

Another feature of this invention is that one end of the gain element has an internal face that is AR coated for the resonator mode and the resonator mode exits (or enters) this face at 0° (normal incidence).

Another feature of this invention is that a modification has one end of the gain element with an internal face that is curved and coated as a partial reflector ("monolithic resonator") of resonator mode radiation and through which the resonator mode exits (or enters) this face at 0° (normal incidence).

Another feature of this invention is that the resonator mode is a hemispherical mode with a focus (or waist) at the external face.

Another feature of this invention is that the total deviation of the beam inside the gain element is 90° so that the direction of the resonator mode beam exiting the internal face is 90° from the direction of the pumping mode beam incident on the external face.

Another feature of this invention is that there is no resonator mode astigmatism.

Another feature of this invention is that the gain element is longitudinally pumped at the external face.

Another feature of this invention is that the mode can be pumped along two distinct pump axes at each bounce face (internal-fold face).

Another feature of this invention is that the path of the resonator mode in the gain element can be non-planar.

Another feature of this invention is that the resonator mode can cross over itself, leading to a compact resonator.

Another feature of this invention is that the crystal growth planes of the gain element are oriented to not be parallel to the resonator mode along any leg of the mode to reduce diffraction losses and assure a plane polarized output beam.

These and other objects, advantages and features of the invention will become more readily apparent from the ensuing specification and claims when taken in conjunction with the attached drawings.

BRIEF DESCRIPTION OF THE DRAWINGS

FIG. 7 shows an extraction of second harmonic light from an internally folded resonator fabricated in accordance with this inventive concept.

FIGS. 8a, 8b and 8c depict several means of separating the pumping mode radiation from the second harmonic output.

DESCRIPTION OF THE PREFERRED EMBODIMENT

Figure 1:
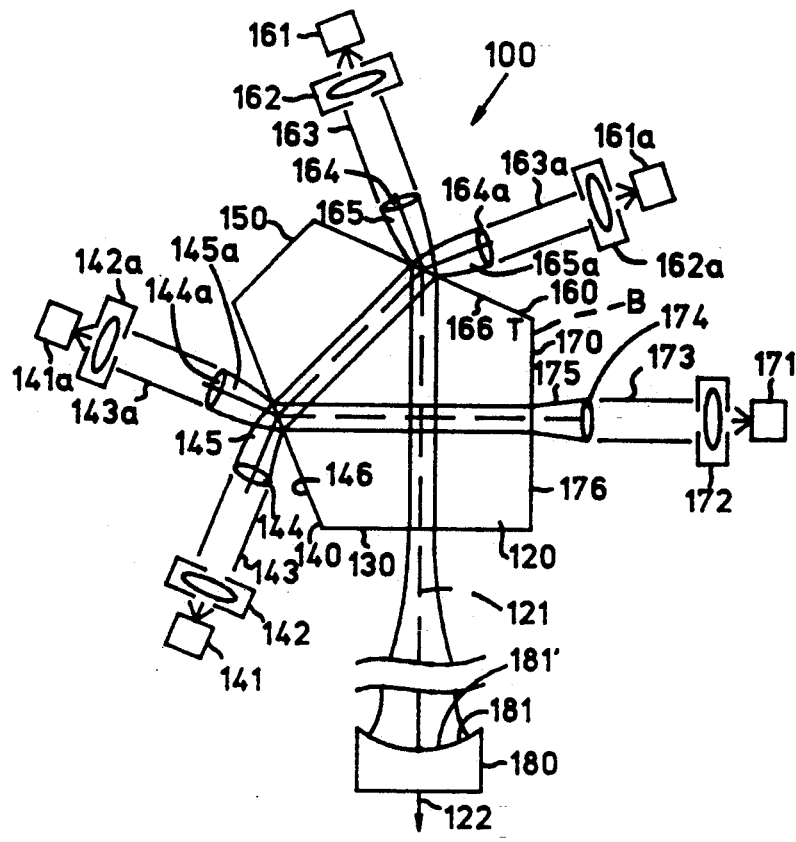
FIG. 1 is a schematic representation of an internally folded scalable laser pumped by multiple sources in a penta-prism configuration.
Figure 2:
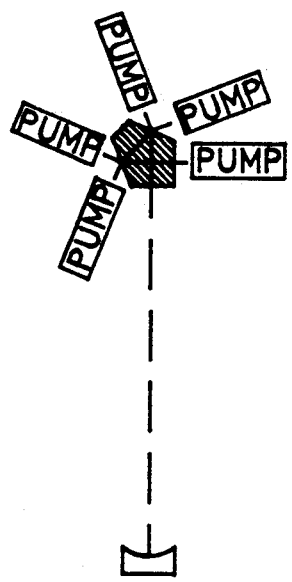
FIG. 2 is a schematic representation of an internally folded scalable laser in the penta-prism configuration of FIG. 1 depicting the spatial relationship between the gain medium and the output coupler and showing the pump axes and crystal growth planes of the gain medium.

The salient features of this inventive concept are to a further improvement in output power of a laser having a hemispherical resonator. The hemispherical resonator gives the highest slope efficiency and overall efficiency for laser diode pumping. In addition, it leads naturally to the $TEM_{00}$ resonator mode (the preferred mode of operating a laser) without requiring apertures in the cavity or other means to effect this $TEM_{00}$ mode. A standard end-pumped hemispherical resonator consists of two elements exclusive of the pump optics. The first is a gain medium or gain element in any shape (usually a rod) with two flat and parallel optically polished faces (internal and external faces). These faces are oriented to be normal to the resonator axis. The hemispherical resonator concentrates the laser mode (resonator mode) to a focal point (or waist) at the external face of the gain element. The external face is HR (highly reflective) coated for the laser wavelength (resonator mode), which for Nd:YAG is usually 1.06μ, and HT (highly transmissive) coated for the pump diode wavelength (pumping mode), which is 808 nm for Nd:YAG. The interior face of the gain element is AR (antireflective) coated for the resonator mode wavelength.

The second element of the hemispherical resonator cavity is a curved mirror, concave on the face closest to the gain element, and positioned with respect to the external face of the gain element so that the resonator mode waist occurs at this face. Pumping mode radiation is focused into the gain element at the external face, coming to a focus at or near the location of the resonator mode waist. The very high efficiency and very low threshold power come from the high pump power density, i.e.; power per $cm^2$, and the small resonator waist size. The $TEM_{00}$ operation comes from the phenomenon known as "gain aperturing", where the highest gain occurs only for this particular resonator mode. The details of performance for end-pumping are given in an article by R. Scheps entitled "Efficient laser diode pumped Nd lasers", *Appl. Opt.*, Vol. 28, No. 1, Jan. 1, 1989. The details of the effects of pump and resonator waists on the laser operation are given by the Risk article cited above.

The end-pumped hemispherical resonator laser is in itself a noteworthy advance in the state of the art yet, a need remains for the capability for scaling it. Or, in other words, how is more power gotten out of an end-pumped hemispherical laser while maintaining the very high slope efficiency and low threshold and $TEM_{00}$ operation that was discussed in the Scheps article in the preceding paragraph.

To understand the solution, two obstacles to scaling this type of resonator must be recognized. The first is that only single stripe or coherent, phased array type diodes can be used to end pump into a small diameter waist. At present, the maximum power available from such diodes is 3 Watts. The second is that if too much pump power is concentrated into a small volume, thermal heating occurs and the overall efficiency goes down.

This inventive concept therefore is to provide for scaling an end-pumped hemispherical laser using a folded hemispherical resonator pumped with multiple laser diodes and maintaining a small resonator mode for good efficiency, low threshold, and $TEM_{00}$ operation. In addition, a compact size for the gain element is maintained by multiple internal folds. A standard folded resonator is one in which a flat mirror is used inside the laser resonator cavity to change the direction of resonator mode radiation. The flat mirror does not change any other properties of the resonator. In this inventive concept the folding is provided by facets of the gain medium which provide "bounce" points inside of the gain medium and provide the opportunity to couple additional pumping mode radiation into the resonator cavity. This feature removes the alignment and stability issues otherwise associated with discrete fold mirrors. Another advantage of internal fold surfaces is that each bounce point can be pumped along two separate pump axes because pumping can be directed in the direction of the resonator mode as it comes to a bounce surface, and again as it goes away from the bounce surface. Also, short focal length lenses can be used for such an internal fold mirror, since the focal components can be brought close to the bounce surface. The physical constraints of pumping through a discrete fold mirror prevent a close proximity to the gain element and therefore longer focal length lenses must be used. A consequence of the longer focal length lenses is that they create larger pump waists in the gain element which leads to lower efficiency and higher pump threshold power.

Referring to FIG. 1, an embodiment of a laser 100 of this inventive concept, which includes a gain medium 120 and an output coupler 180, has its active gain medium 120 fashioned in a penta-prism configuration. This configuration assures that total internal reflection doesn't occur at internal fold surfaces to prevent the complete overlap of pump and resonator modes. Five sides or faces 130, 140, 150, 160 and 170 extend between a top and a bottom planar face T and B to define the limits of the gain medium 120. In accordance with this inventive concept some of these faces are more specifically designated an interior face 130, internal-fold faces 140 and 160 and an exterior face 170. Exterior face 170 and interior orthogonal face 130 define an angle of 90 degrees between them and 112.5 degree angles are formed between the faces 130 and 140, and 160 and 170, which partially subtend the 90 degree angle. An output coupler 180 has a dish-shaped or concave surface 181 provided with a coating 181' that is partially reflective of the resonator mode. The output coupler has a suitable radius of curvature to define a laser resonator extending from surface 181 to external orthogonal face 170 of gain medium 120. This resonator has a resonator mode path 121 that is a folded path that extends the distance from orthogonal external face 170 to face 140 to face 160 through orthogonal internal face 130 and to surface 181 of output coupler 180.

A source of pumping emissions 171, which may be one or more laser diodes, emits to an optical beam shaper 172 that may have one or more lenses and appropriate devices for providing a collimated pump beam 173 that impinges on a suitable lens 174. Lens 174 appropriately tailors collimated pump beam 173 into a pumping beam 175 transmitted through a coating 176 on gain medium exterior face 170. Coating 176 is selected to be highly transmissive to the pumping mode emission yet be highly reflective to resonator mode emission created in gain medium 120. Pumping mode beam 175 is aligned to be as coincident as possible with resonator mode path 121 as it extends between external face 170 and internal-fold face 140. A pumping mode waist occurs at or near external face 170.

Pumping emission sources 141 and 141a with their associated optical beam shaping arrangement 142 and 142a emit collimated pump beams 143 and 143a to interposed lenses 144 and 144a. Lenses 144 and 144a appropriately shape the collimated pump beam to pumping beams 145 and 145a which are transmitted through a coating 146 on gain medium face 140. The coating is highly transmissive to the pumping mode emissions 145 and 145a but are coated highly reflective at the resonator mode emissions of gain medium 120 at the appropriate angles of incidence. Overlap of pumping mode beams 145 and 145a with the resonator mode in resonator mode path 121 is maximized in the gain medium by proper alignment. In like manner, another pair of pumping beam arrangements are provided in association with face 160 of gain medium 120. A source of pumping emissions 161 and 161a emit to an optical shaping arrangement 162 and 162a which each provides a collimated pump beam 163 and 163a. Lenses 164 and 164a shape the collimated pump beams into pumping beams 165 and 165a which are transmitted through a coating 166 on the gain medium face 160. Coating 166 is selected to be highly transmissive at the pumping mode wavelength, yet highly reflective at the resonator mode emissions of gain medium 120 at the appropriate angles of incidence. Overlap of pumping mode beams 165 and 165a with the resonator mode in resonator mode path 121 is maximized in the gain medium by proper alignment. Coatings 166 and 146 are HT at 808 nm for an external angle of about 45° and HR at $1.06\mu$ for an internal angle of about 22.5°.

The resonator mode is emitted in gain medium 120 along the resonator mode path 121 from exterior face 170 to face 140 where it bounces to face 160 and is bounced through interior face 130 which is highly transmissive to resonator mode radiation to surface 181 of output coupler 180. Resonator mode emissions are reflected from surface 181 of output coupler 180 through interior face 130 to further stimulate the emission of gain medium 120. Since output coupler 181 is about 94 to 98 percent reflective at the resonator mode wavelength, an output 122 is emitted. The resonator mode radiation exits the gain medium orthogonal to interior face 130. This avoids the astigmatism created when more than one focal point, e.g. the tangential and the saggital focal points, might otherwise be generated if the resonator mode is at a non-normal angle of incidence with the interior face. Thus, the curvature of output coupler 180 is such as to focus the resonator mode at the single point or waist at exterior face 170.

It is to be noted that the pumping modes 175, 145, 145a, 165 and 165a are oriented and tailored to overlap with the resonator mode. The additive pumping of the pumping mode 175, 145, 145a, 165 and 165a thusly assure that the increased pumping levels provided thereby are not such as to concentrate the pumping mode at any one spot. The several orientations of the pumping modes aligned with the resonator mode provides for increased power output without concentrating the pumping mode in any one spot, and thereby lessens the problems associated with heating of the gain medium.

Figure 3:
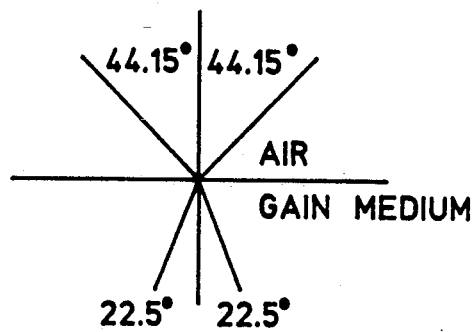
FIG. 3 is a schematic representation of part of an internally folded scalable laser depicting refraction of a pumping mode as it passes from air into the gain medium.

Noting FIG. 3, there is a refraction where the pumping mode radiation, angularly, (at other than the normal) passes through the transition from the lower index of refraction medium, such as air, to the higher index of refraction, such as the gain medium. A Nd:YAG gain medium has an index of refraction of about 1.82. This index of refraction causes, for example, a location of the components associated with the generation of pumping modes 165 and 165a to each have an angle of incidence of about 44.15 degrees from the normal of gain medium face 160 and will cause a refraction to about 22.5 degrees with respect to the normal of surface 160 in the gain medium. This same refraction of about 22.5 degrees of the pumping mode 145 and 145a cause a location of the components associated with the generation of pumping modes 145 and 145a to each have an angle of incidence of about 44.15 degrees from the normal of gain medium face 140 so that these pumping emissions coincide with the resonator mode within gain medium 120.

Pumping mode radiation 175 that is associated with pumping source 171 is at the normal to exterior face 170. This avoids the astigmatism created when more than one focal point, e.g. the tangential and the saggital focal points, might otherwise be generated if the pumping mode is at an angle to the exterior face. The normal directed pumping mode 175 is focused in a single point or waist at or slightly inside of exterior face 170.

The penta-prism configuration of the gain medium described above assures that the resonator mode radiation undergoes 2 bounces and deviates a total of 90 degrees with respect to the incoming beam and allows pumping at each bounce point. The ability to pump at each bounce point and completely overlap the resonator mode with the pump beam results because the angle of incidence made at each internal-fold face is about 22.5 degrees with respect to the normal to the face. Note that the critical angle for TIR in Nd:YAG is about 33.3 degrees, so this design will allow complete overlap of the pump and resonator modes if the pump axis makes an approximately 44 degree angle with respect to each face. It is important but not completely necessary in this type of device that the entrance and exit faces (exterior face 170 and interior faces 130 in the penta shape) are orthogonal with respect to the resonator beam, as this eliminates astigmatism in the resonator mode.

The index of refraction of the gain medium and angle of incidence of the pump beam with respect to one of the surfaces are critical design parameters in the design of the multi-faceted gain medium that must be considered to achieve a more acceptable mode overlap between the pumping modes and the resonator mode. An increased refractive index increases the angle between two pump axes at a given face relative to the angle of incidence within the multi-faceted gain medium. As the number of internal-fold faces increases, this angle of incidence for the pumping decreases and, of course, then the angle of incidence between the two pump axes for a given face will also decrease. But, for the penta-prism this angle is about 90°—the angle between the two pump axes—and that facilitates alignment and use of short focal length focussing lenses. Such lenses are vital for compact, high efficiency performance. As the pumping angle between adjacent pumping axes gets smaller, other geometries, such as fiber optics or fiber lenses (GRIN lenses) are chosen since a fiber is very small and nearly a zero angle can be applied. Therefore, the multi-faceted gain element configuration can be a many sided volume of gain material, which itself could be in a solid, liquid or gaseous states. Another factor is that refractive index has an effect on the pumping angle, the pumping angle being an angle between the axes of the pumping source and the normal to the prism's surface. Basically, as the index goes down this angle also goes down. As previously indicated, the incident angle inside the prism is around 22° with the gain material described. That means the angle of incidence outside the prism is about 45°. The range of indices for suitable materials tend to be on the order of 1.35 to 2. Other ranges of refractive indices could be chosen in accordance with this inventive concept.

For the purposes of demonstration only, a gain element was fabricated based on the penta-prism shaped gain element in FIG. 1 and a scaled laser was operated. Referring back to FIG. 1, the length of exterior and interior faces 170 and 130, respectively, were 5 mm. Output coupler 180 was a 10 cm radius of curvature mirror that was 95% reflective at 1.06μ. Five laser diodes were used to pump the prism simultaneously along three axes. Two laser diodes were collimated and polarization-combined to pump through the external face 170 along pump axis 175. The absorbed pump power from this pair of diodes was 1.38 W. Another pair of collimated, polarization-combined laser diodes was used to pump along pump axis 145a. The pump power absorbed in the gain medium from these two sources was 1.36 W. The fifth diode was collimated and pumped the penta-prism along pump axis 165. The pump power absorbed from this diode was 1.89 W. The total absorbed power from all five diodes is 4.63 W, and the total output power from the laser using the penta-prism design was 2.29 W. The threshold pump power was 48 mW, and the resulting slope efficiency is 50%. No evidence of thermal saturation or thermal lensing was observed. The gain element was not fabricated perfectly, and the cumulative deviation caused by the penta-prism was about 100°. Nonetheless, the high conversion efficiency achieved with this gain element shows that the device exhibits a good degree of tolerance for small imperfections in fabrication.

A number of other gain medium configurations could be selected in accordance with the teachings of this inventive concept. For example, referring now to FIG. 4 of the drawings a representative example of an internally folded scalable laser 10 has a Nd:YAG gain medium 15. The gain medium is fabricated in the shape of a right angle prism, more particularly, an isosceles right angle prism having an external face 15a, an internal face 15b that is orthogonal to external face 15a, and a hypotenuse face 15c. In this design the internal fold mirror is simply the hypotenuse. In addition to removing the alignment and mount instabilities associated with the number of elements of a discrete fold mirror, the design of laser 10 requires no coating on hypotenuse face 15c for 1.06μ since the resonator mode is contained by total internal reflection (TIR). A significant advantage for scaling results from the ability to pump gain medium 15 simultaneously along two axes at the hypotenuse in addition to the axis normal to the highly reflective (HR) face, external face 15a. Thus, using 3 W single stripe polarization-combined diodes, pump power levels as high as 18 W may be used in a simple, compact design.

Details of the dimensions and performance of a tested scalable internally folded gain medium will be given. However, it is to be emphasized that these details are merely representative and that other dimensions and/or pump arrangements and/or intracavity elements could be substituted for the presently described invention.

Gain medium 15 typically is fabricated from 1.1% Nd:YAG and is 5 mm thick. The pathlength of the resonator mode through the gain medium from external face 15a to hypotenuse 15c to internal face 15b is 1 cm. To eliminate diffractive losses in the right angle prism-shaped gain medium, the crystal growth planes 15' are oriented at an angle with respect to both legs of the resonator axis. The orientation of the crystal growth planes relative to the resonator mode is a vital and significant feature of this inventive concept. If this orientation is not provided, the laser may not operate efficiently, if at all.

Two orthogonal faces 15a and 15b are 10 mm long. External face 15a has a dichroic coating that is HR at 1.06μ and highly transmissive (HT) at 808 nm, while internal face 15b is anti-reflective (AR) coated at 1.06μ. The hypotenuse is AR coated at 808 nm for an about 45° external angle of incidence.

The resonator is a folded hemispherical configuration and extends from external face 15a through gain medium 15 to a 10 cm radius of curvature, 96% R (reflectivity) output coupler 20. Output coupler 20 reflects a resonator mode in a direction normal to the interior face 15b in a cone-shaped active volume to a focus (waist) at exterior face 15a in gain medium 15. The resonator mode is free from astigmatism otherwise attributed to tangential and saggital focal points because the resonator mode axis is normal to the AR coated internal face 15b of the right angle prism-shaped gain medium.

One arrangement to provide for an operation of the folded laser is set out in detail below. This set-up is for the purposes of demonstration only and, largely reflects an operation of this inventive concept demonstrated using components on hand to show how the laser responds to certain parametric variations. It is likely that other pumping arrangements may be selected for a variety of embodiments in accordance with this inventive concept. Three different pump sources provide pumping mode radiation for gain medium 15. A single stripe 3 W laser diode 30, a pair of polarization-combined single stripe 1 W diodes 40, and a Ti:sapphire laser 50 combined their emissions to provide pumping mode radiations for the gain medium. Combination of the two 1 W laser diodes was accomplished with a polarization beam combining cube. The three sources produce different pump waist sizes in the prism-shaped gain medium and could therefore be used to demonstrate the effect of pump size on pump efficiency.

The emissions from sources 30 and 40 are collimated with an anamorphic lens pair 30a and 40a that are each made up from a high numerical aperture spherical lens and a cylindrical lens. In addition, 40a includes a polarization beam combiner cube. Collimated pump light 30b is directed in a direction normal to exterior face 15a and is focused at or near the orthogonal exterior face 15a with an 8 mm focal length lens 30c. In order to simultaneously use both pump axes at the hypotenuse, collimated pump light 40b and 50b from, source 40 and 50 are beamed to separate lenses 40c and 50c, e.g. a 25 mm focal length lens. Noting FIG. 5, for second harmonic generation, a 5 mm long KTP crystal 60 is inserted in the cavity close to the AR coated internal face 15b. To produce repetitive Q-switched operation a mechanical chopper 70 operating at 2.88 KHz was inserted near output coupler 20, see the article by R. Scheps et al. entitled, "CW and Q-Switched Operation of a Low Threshold $Cr^{+3}$:LiCaAlF$_6$ Laser", *IEEE Photonics Tech. Lett.*, Vol. 2 (1990), pp. 626-628. The mechanical chopper was used for the purposes of demonstrating this inventive concept out of convenience. Preferably, for repetitive Q-switching an acousto-optic modulator is substituted for the mechanical chopper.

The considerations for efficient pumping with pumping mode radiation from sources 40 and 50 at hypotenuse 15c are somewhat different than those for pumping through external orthogonal face 15a which is pumped in a direction normal to face 15 to avoid pumping mode astigmatism (attributed to the tangential and saggital focal points). Due to TIR at the hypotenuse it is not possible to align the pumping mode propagation axis within the prism to be collinear with the resonator mode axis. Instead, pump efficiency is optimized by maximizing the spatial overlap between the pumping and resonator modes in the crystal. Since the overlap region is relatively short, good efficiency depends on the strong absorption of the Nd ion at 808 nm.

Figure 6:
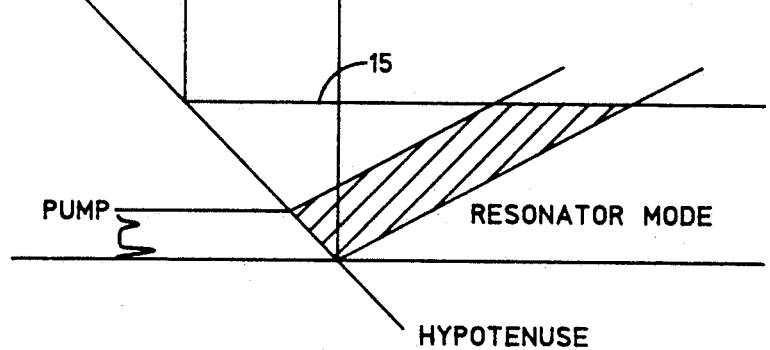
FIG. 6 schematically depicts details of overlap between a diode pump beam and the resonator mode in the region near the prism hypotenuse of the right angle prism-shaped configuration of the gain medium for the laser. View is for a pump diode with its junction in the plane of the page. Pump beam refracts into the prism at about 23°. Overlap is represented with hatching, and far-field intensity distribution for a 1 W diode is shown. Resonator mode diameter is 360μ and pump beam diameter is 100μ. Pump beam and resonator mode divergence throughout overlap region is small.

In the present context of this embodiment the term "end-pumping" is distinguished which describes the process at the hypotenuse, from "longitudinal pumping" which refers to the pump process at external orthogonal face 15a. This distinction is based on whether the pump propagation and resonator mode axes are collinear. The details of the pump flux deposition at the hypotenuse are shown schematically in FIG. 6. This is but one arrangement to provide for an operation of the gain element set out in detail below. This is for the purposes of demonstration only and, largely reflects an operation of this inventive concept demonstrated to show how the laser responds to certain parametric variations. It is likely that other pumping arrangements may be selected for a variety of embodiments in accordance with this inventive concept. The pump axis, which is parallel to the resonator mode in free space, refracts into the prism at 23°. The resonator mode radius at the hypotenuse is approximately 180μ. The maximum absorption length through the overlap region is 950μ. For this length 59% of the pump light is absorbed within the resonator mode volume. The average absorption for the entire pump beam will be somewhat lower as the extreme rays have a shorter pathlength through the overlap region. However, the far field profile of the pump consists of two unequal intensity, 25μ wide lobes. Proper pump alignment therefore requires that the brighter lobe have the longest absorption path through the active volume. It should be noted that this type of optical pumping, where the pump and resonator paths cross in the active medium, is similar to the manner used to pump dye laser jets. Optical conversion efficiencies for diode pumped Nd:YAG of 25% or more are typically obtained when end-pumping in this manner. One way to improve the efficiency would be to use a higher Nd-doping density. Therefore, more of the pump light would be absorbed before refracting away from the resonator axis. Of course, this may limit scaling, as depositing too much energy in a small volume leads to adverse thermal effects. A second approach to enhance the performance of this design would be to use a Nd:host crystal with a refractive index of less than 1.414. The 1.414 index determines whether or not the resonator beam displays total internal reflection (TIR). In the proposed design, the internal angle is about 45 degrees. If there is TIR, then one cannot pump the hypotenuse along an angle such that after refraction it coincides with the resonator mode. However, if the refractive index is less than 1.414, an angle can be found for the pump axis with respect to the hypotenuse such that after refraction the pump axis and resonator mode axis overlap. This will dramatically improve the laser efficiency.

Figure 4:
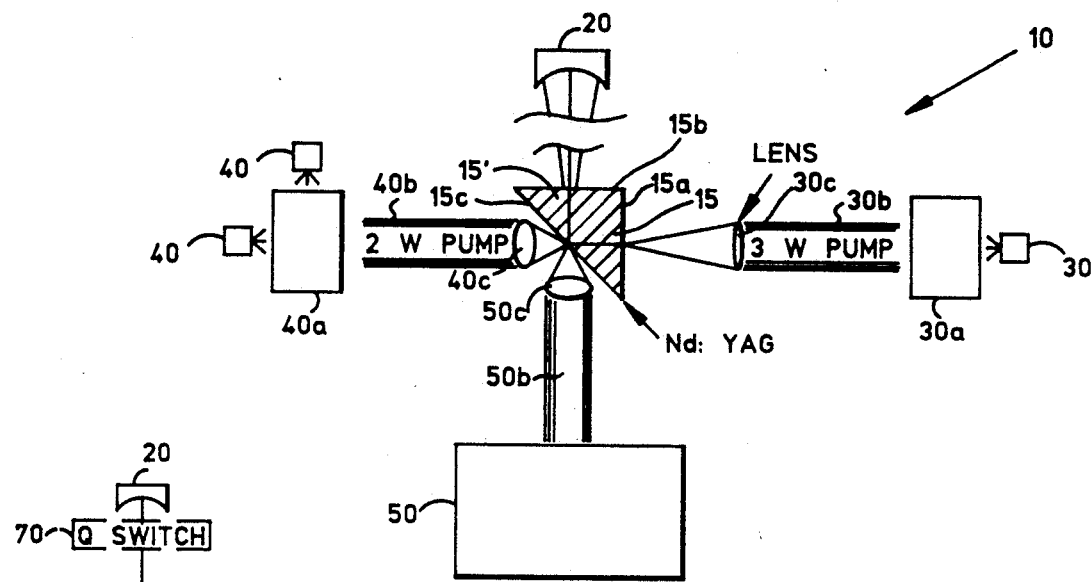
FIG. 4 shows an internally folded scalable laser with a gain medium in a right angle prism-shaped configuration pumped by multiple pumping sources. Absorbed pump power along each axis is 1.9 W, 1.5 W and 330 mW for the 3 W, 2 W and Ti:sapphire sources, respectively. Crystal growth planes in the gain medium are parallel to the hatch lines shown for the gain medium.

The pump geometry as shown in FIG. 4 is not optimized for pumping at the hypotenuse, and a greater degree of overlap could be achieved by increasing the angle of incidence of the pump axis at the hypotenuse. However, doing so compromises the simplicity of the pump geometry and would have created unworkable congestion in the initial demonstration since standard optical hardware was used.

Figure 5:
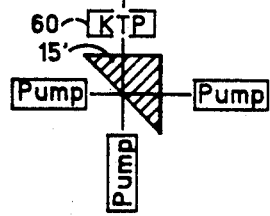
FIG. 5 shows the internally folded scalable laser with a gain medium in a right angle prism-shaped configuration of FIG. 4 depicting the spatial relationship between the gain medium and the output coupler.

Using the pump arrangement shown in FIGS. 4 and 5, 3.73 W of pump power produces 1.30 W of fundamental radiation, giving an optical conversion efficiency of 35%. The specific parameters discussed below are for the purposes of demonstration of this inventive concept only and are not to be construed as being limiting. Other pumping arrangements may be selected for a variety of embodiments in accordance with this inventive concept. Longitudinal pumping with 1.9 W from laser diode 30 produces 820 mW from the resonator and a slope efficiency of 45%. The slope efficiencies for additional pumping at the hypotenuse with the polarization combined 1 W diodes 40 and Ti:sapphire laser 50 are 24% and 38%, respectively. The product of the slope efficiency for longitudinal pumping, 45%, and the percentage of power absorbed in the overlap region at the hypotenuse, 59%, is 26%, which is in good agreement with a 24% observed slope efficiency. This leads to the conclusion that the lower slope efficiency measured at the hypotenuse is primarily a result of the walk-off of the pump beam relative to the resonator axis. The higher slope efficiency for the Ti:sapphire pump 50 is related to the smaller pump waist, please note the article by W. P. Risk entitled, "Modeling of Longitudinally Pumped Solid-State Lasers Exhibiting Reabsorption Loss", *J. Opt. Soc. Am.* B, Vol. 5 (1988), pp. 1412–1423. The output was found to be linearly polarized (25:1) in the plane of the gain medium prism. This preference for one polarization is due to the small differential reflective loss for the orthogonal polarization in traversing the crystal growth planes. The crystal growth planes intersect the mode axis at about 45° and are parallel to the hatch lines shown in FIG. 4. Note that having this high polarization ratio, which is a natural outgrowth of the specific way that the prism is manufactured in this inventive concept, is very important for giving good second harmonic (green) output.

The focused spot dimensions for the 3 W diode 30 at external orthogonal face 15a are measured to be $130 \times 10$ $\mu^2$ while for the 1 W diodes 40 dimensions are 100 by 10 $\mu^2$. A determination of the effect of the different focused spot sizes on the pumping efficiency of the gain medium prism is obtained by rotating it so that the polarization-combined 1 W diodes 40 longitudinally pump external orthogonal face 15a and the 3 W diode 30 end-pumps hypotenuse 15c. Using the three laser diodes, 3.44 W of pump power produces 1.05 W of output power. The optical conversion efficiency is 31%. The slope efficiency for longitudinal pumping with the polarization combined diodes is 48% and that for additional pumping with the 3 W diode at the hypotenuse is 19%. For this pump arrangement the waist at external orthogonal face 15a is smaller and the slope efficiency is therefore higher than that obtained for pumping this same face with the 3 W diode. The reduced efficiency for pumping at the hypotenuse with the 3 W diode 30 relative to that obtained for pumping with the two 1 W diodes 40 is a consequence of the larger ratio of pump waist to resonator mode diameter at hypotenuse 15c and the more uniform far field pattern of the diode. The pump power deposited in the overlap region is therefore lower.

Output coupler 20 is re-positioned to optimize the resonator performance for pumping with 3 W diode 30 at hypotenuse 15c to verify these findings, see FIG. 4. A slope efficiency of 24% is obtained.

With KTP crystal 60 inserted in the resonator and a dichroic output coupler 20 (HR at 1.06$\mu$ and HT at 532 nm) replacing the 96% reflective mirror of the output coupler 20, the three laser diodes (which together generate 1.17 W at 1.06$\mu$) produce 128 mW cw at 532 nm. The second harmonic conversion efficiency for optical flux in the "forward" direction is 11%, but it should be noted that a comparable amount of green power is generated in the reverse direction and can not be measured. This may be a disadvantage of the present geometry, although it would be possible to coat the KTP crystal face closest to gain medium prism 15 to be HR at 532 nm and thus extract the second harmonic power generated in either direction. The amplitude stability of the 532 nm radiation is good, showing 5% intensity spikes on a flat background at approximately 30 KHz.

The limitations due to TIR at the hypotenuse 15c notwithstanding, an important advantage of the folded resonator for intracavity second harmonic generation is that second harmonic power generated in either direction by a non-linear crystal such as KTP can be extracted in a single beam through one of the internal fold mirrors. As an example, the penta-prism resonator is shown in FIG. 7. Output coupler 180 is replaced with output coupler 180' which is coated HR at both 1.06$\mu$ and 532 nm (green light). One of the internal fold faces, for example face 160, is coated HR at 1.06$\mu$ and HT at both 808 nm and 532 nm. Thus second harmonic 532 nm light generated by KTP crystal 195 in the direction towards output coupler 180 ("forward direction") is reflected at surface 182 and re-directed back through the KTP crystal towards internal face 130. Second harmonic light generated by the KTP crystal in the direction away from output coupler 180 ("rear direction") is coincident with the reflected forward generated 532 nm light. Both green beams propagate collinearly towards internal fold face 160. Since this face in this example is highly transmissive for 532 nm light, both the forward generated and rear generated second harmonic output may be extracted in a single beam 198, exiting gain element 120 at internal fold face 160. Similar arrangements can be made for other internally folded multifaceted gain elements as long as TIR is not present at the given internal fold face. This type of operation produces approximately twice as much second harmonic output at any given power level than would be obtained if only second harmonic light generated in the forward direction is extracted. It is to be noted that the extracted second harmonic power exits along one of the pump axes, axis 165 of FIG. 1 in the example given. If axis 165 is being used for pumping, means must be provided to separate the second harmonic light from the pump axis before it is blocked by laser diode 161 of FIG. 1. This can be done simply, for example, with a dichroic beam splitter 114 which is HR at 532 nm and HT at 808 nm, see FIG. 8a, with dispersive optics such as a refractive prism 115, see FIG. 8b, or with a diffraction grating 116, see FIG. 8c.

For clarity, the small difference in the angle of refraction at internal fold surface 160 between the pump light at 808 nm and the second harmonic light at 532 nm is not shown in FIGS. 8a, 8b and 8c. In practice, this small differential in the angle of refraction easily is accounted for.

Referring once again to FIGS. 4, 5, and 6, using intracavity mechanical chopper 70 in conjunction with KTP crystal 60, 93 mW average cw power is obtained at 2.88 KHz in a 75 ns FWHM pulse. From previously published data measuring the variation in average power with Q-switch rate, see R. B. Chesler et al.'s "An Experimental and Theoretical Study of High Repetition Rate Q-switched Nd:YAIG Lasers", *Proc. IEEE*, Vol. 58 (1970), pp. 1899-1914, almost twice this average power at a repetition rate of 20 KHz might be expected.

Repetitive Q-switched operation also is produced for the fundamental wavelength. The optimum output coupling for Q-switching can be determined by calculations recently published by J. J. Degnan in the article, "Theory of the Optimally Coupled Q-Switched Laser", *IEEE J. Quantum Electron.*, Vol. 25 (1989), pp. 214-220.

A Findlay-Clay analysis performed on the resonator determines the round-trip dissipative loss and small signal gain, see D. Findlay et al.'s article "The Measurement of Internal Losses in 4-Level Lasers", *Phys. Lett.*, Vol. 20 (1966), pp. 277-278. These values are $7.95 \times 10^{-3}$ and $7.89 \times 10^{-4}$ mW$^{-1}$, respectively.

The optimum output coupling $R_{opt}$ can be calculated by $$X_{opt} = L \left[ \frac{z - 1 - \ln z}{\ln z} \right] \quad (1)$$

where $z = 2g_o l$ is the small signal gain, L is the round-trip dissipative loss (without output coupling) and $R_{opt} = \exp[-X_{opt}]$. The pulsewidth $t_p$ is given by $$t_p = \frac{t_r}{L} \left[ \frac{\ln z}{z - \left[\frac{z-1}{\ln z}\right]\left[1 + \ln\left[\frac{z \ln z}{z-1}\right]\right]} \right] \quad (2)$$

where $t_r = 2l_c/c$ is the round-trip transit time, $l_c$ is the cavity length and c is the speed of light. For a pump power of 1 W the optimum reflectivity is 0.85 and the calculated pulsewidth is 8.5 ns. Operation with a mechanical Q-switch and a 0.85 R output coupler produces a pulsewidth of 40 ns. Pumping with 1.6 W produces a minimum pulse width of 32 ns and an average power of 169 mW at 2.88 KHz. The discrepancy between the calculated and measured pulsewidths is due in part to the relatively slow opening time of the mechanical shutter, but will be greatly improved with an acousto-optical Q-switch.

The configuration of a right angle prism or isosceles right triangle-shaped gain medium of an internally folded Nd:YAG laser as described herein demonstrates its potential for scaling. The prism geometry operates as a stable, simple and compact resonator. When pumping With 3.73 W at 808 nm, 1.3 W of fundamental output is obtained with no evidence of thermal saturation. In addition, good second harmonic conversion efficiency is achieved and 128 mW of low noise output is obtained. Optionally using current diode technology, this device can be pumped with a total of 18 W, and, when the demonstrated performance is maintained at this pump power level 5.6 W out is expected. A simple extension of the present design would be to replace the AR internal orthogonal face 15b with a convex spherical surface, forming a completely monolithic device. Pumping the prism at the hypotenuse is somewhat less efficient than traditional longitudinal pumping, but increasing the angle of incidence of the pump sources at the hypotenuse increases the efficiency for end-pumping. It is important to note that for laser materials such as Cr:LiCAF, where the refractive index is 1.39, TIR does not occur at the hypotenuse and such a prism could be longitudinally pumped along all three axes, see the last cited article by see R. Scheps et al. above. The right angle prism configuration does not allow a complete overlap between the pump and resonator modes at the hypotenuse and represents a difficulty that is not representative of other versions of this device.

Figure 9:
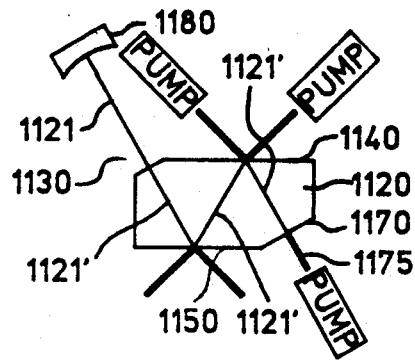
FIG. 9 is another representative configuration of the gain medium fabricated in accordance with this inventive concept in which the pumping mode radiation impinges at the normal to the external face in a waist at or near the external face and the resonator mode radiation is normal to the interior face with the output coupler defining a hemispherically-shaped resonator cavity that focuses the resonator mode at the waist at the external face to overlap with the pumping mode.

The shape of the gain medium can be varied in accordance with the teachings of this inventive concept to depart from those specifically mentioned so long as sufficient design care is exercised to achieve a desirable mode overlapping. Looking to FIG. 9, a multi-faceted gain medium 1120 is configured in a hexagonal shape. Pumping mode radiation 1175 impinges at the normal to external face 1170 in a waist at or near the external face. Resonator mode radiation in path 1121 is at the normal to interior face 1130 and output coupler 1180 defines a hemispherically-shaped resonator cavity along resonator path 1121-1121' that focuses the resonator mode at the waist at the external face to overlap with the pumping mode. Mode overlapping is assured without pumping mode or resonator mode astigmatism. More pumping mode radiation can be applied to the internal-fold faces 1140 and 1150 and KTP and Q-switches can be chosen if a particular output is desired.

For the penta-prism, as well as all other multi-faceted device configurations envisioned by one skilled in the art in accordance with this inventive concept, it is possible and may be desirable to machine the element in the variety of forms of a monolithic laser. For example, it is within this inventive concept to contour the exit face of emissions (interior face 130 in FIG. 1 above) to be convex rather than flat, and the contoured face is coated to act as a partial reflector for the resonator radiation. Coatings on all other faces which are used to "bounce" the beam must be coated HR at the laser wavelength and HT at the pump wavelength at the appropriate angles of incidence. In the case where at any given surface there is TIR, e.g., with the right-angle prism, that face is already HR at the resonator mode, so would only have to be coated AR for the pump wavelength.

An important variation of this inventive concept is for use as an optical amplifier. Typically, amplifiers are transversely pumped and are generally inefficient for input beams that are low power or small diameter. An end-pumped amplifier is more suitable for these types of input beams, but obstacles to scaling end-pumped amplifiers are similar to those for scaling end-pumped lasers. The need for amplification of low power or small diameter signals can be illustrated for the 1.06μ laser transition in Nd:YAG by two examples, although many more for this and other laser materials can be identified. Recently, laser diodes operating at 1.06μ have been fabricated. These lasers are low power, under 10 mW, but can be modulated at rates exceeding 1 GHz and as a result are considered potentially valuable for use in free space high data rate optical communications systems. However, 10 mW is too little power for a practical system. By use of an optical amplifier of the type described in this inventive concept, several Watts of modulated power may be obtained. A second example is the single frequency, narrow bandwidth diode-pumped ring laser. These devices emit very narrow spectral bandwidths at low power, and are difficult to scale to higher power without introducing instabilities in the output frequency. Currently, only 100 mW or so is commercially available in such a laser. It is far simpler to use an amplifier to boost the power of the single frequency laser than to scale it directly and be forced to resolve the resulting instabilities.

Figure 10:
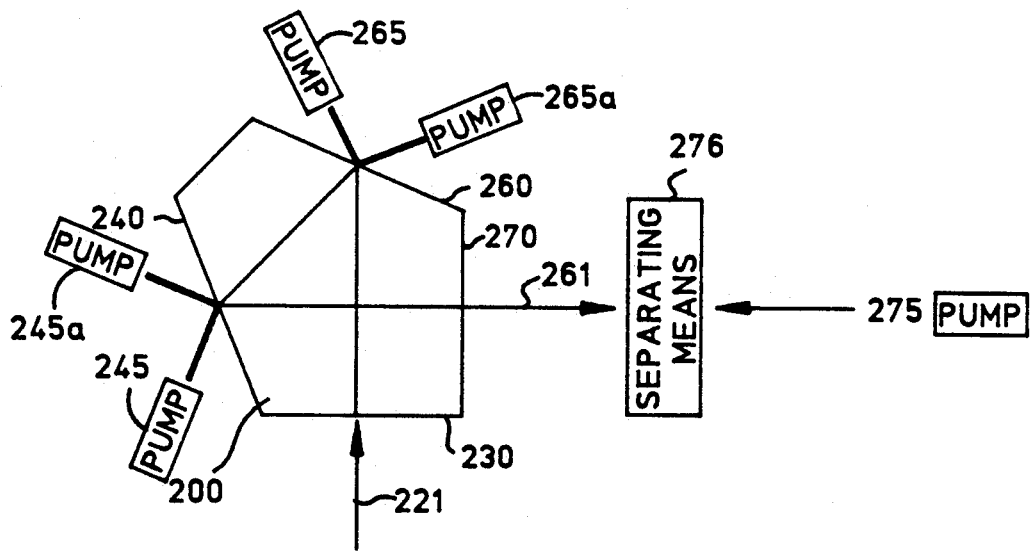
FIG. 10 depicts the penta-prism gain medium oriented for use as a laser amplifier.

The internally folded, scalable laser is readily converted to an internally folded, scalable amplifier. A single pass design is shown schematically in FIG. 10. Referring to FIG. 10, the penta-prism optical amplifier 200 is similar in many ways to laser 100 in FIG. 1. The main difference is that output coupler 180 is removed and both external face 170 and internal face 130 of FIG. 1, re-numbered and redesignated exit face 270 and entrance face 230, respectively, in FIG. 10, are coated AR for the input wavelength beam 221. Input low power beam 221 enters the amplifier through face 230, incurring no astigmatism. It propagates through the gain element by internally reflecting off face 260, then reflecting off face 240, and exiting the gain element as amplified beam 261 through face 270. As it passes through the prism from face 230 to face 270, it is amplified sequentially by the inversion created by pump sources 265, 265a, 245 and 245a. The efficiency of this type of amplification process is very high due to the ideal mode matching achievable between the beam to be amplified and the inversion profile created by the pump source. An additional pump axis 275, analogous to pump axis 175 in FIG. 1, can be accommodated in this amplifier. A means 276 for separating the pump and amplifier beams must be provided, and techniques similar to those shown in FIGS. 8a–8c would be suitable to accomplish this. If pump axis 275 is used, face 270 must be AR coated for both the pump wavelength and the wavelength of amplified beam 261.

Obviously, many modifications and variations of the present invention are possible in the light of the above teachings. It is therefore to be understood that within the scope of the appended claims, the invention may be practiced otherwise than as specifically described.

It is claimed:

1. An internally folded laser comprising:
    a gain medium producing a resonator mode of radiation, said gain medium being provided with an external face, an internal face and at least one internal-fold face all disposed with respect to one another to reflect a 90° deviation of said resonator mode in said gain medium, said internal face being antireflective to resonator mode radiation and said external face and said at least one internal-fold face being highly reflective to resonator mode radiation and highly transmissive to pumping mode radiation;
    an output coupler partially reflective of said resonator mode radiation, said output coupler being configured and spaced from said internal face of said gain medium and oriented to receive and reflect said resonator mode radiation in a direction normal to said internal face to define an approximately hemispherically-shaped folded resonator cavity that extends from said output coupler through an active volume in said gain medium to said external face of said gain medium to effect said 90° deviation of said resonator mode therein, said resonator mode radiation being in a direction normal to said internal face of said gain medium to avoid resonator mode astigmatism; and
    a plurality of sources of pumping mode radiation, a first of the plurality of pumping mode radiation sources being disposed adjacent to said external face and oriented to focus a first pumping mode radiation in a direction normal to said external face to avoid pumping mode astigmatism in a waist in said gain medium at said external face in said folded resonator cavity to define an active volume and at least one other of said plurality of pumping mode radiation sources oriented to direct other pumping mode radiation through said at least one internal-fold face of said gain medium to at least partially overlap said first pumping mode radiation in a portion of said active volume in said gain medium.

2. A laser according to claim 1 in which said at least one other of said plurality of pumping mode radiation sources is a pair of said plurality of pumping mode radiation sources located with respect to said at least one other internal-fold face to each respectively direct pumping mode radiation into a different portion of said active volume in said gain medium to at least partially overlap the resonator mode radiation therein.

3. A laser according to claim 2 in which said output coupler has a radius of curvature to reflect said resonator mode through said active volume in said gain medium and said output coupler is spaced from said gain medium to concentrate said resonator mode to locate said waist at said external face.

4. A laser according to claim 3 further including:
    a second harmonic generating crystal located interposed between said output coupler and said internal face to generate a second harmonic conversion.

5. A laser according to claim 3 further including a a Q-switch interposed between said output coupler and said internal face to interrupt radiation to generate Q-switched operation.

6. A laser according to claim 3 in which the gain medium has a penta-prism-shaped configuration.

7. A laser according to claim 3 in which the gain medium has a right angle prism-shaped configuration.

8. A laser according to claim 2 in which the gain medium has a penta-prism-shaped configuration.

9. A laser according to claim 2 in which the gain medium has a right angle prism-shaped configuration.

10. An internally folded laser comprising:
    a gain medium producing a resonator mode of radiation, said gain medium being provided with an external face, an internal face and at least one internal-fold face all disposed with respect to one another to reflect a deviation of said resonator mode in said gain medium, said internal face being antireflective to resonator mode radiation and said external face and said at least one internal-fold face being highly reflective to resonator mode radiation and highly transmissive to pumping mode radiation;
    an output coupler partially reflective of said resonator mode radiation, said output coupler being configured and spaced from said internal face of said gain medium and oriented to receive and reflect said resonator mode radiation in a direction normal to said internal face to define an approximately hemispherically-shaped folded resonator cavity that extends from said output coupler through an active volume in said gain medium to said external face of said gain medium to effect said deviation of said resonator mode therein, said resonator mode radiation being in a direction normal to said internal face of said gain medium to avoid resonator mode astigmatism; and a plurality of sources of pumping mode radiation, a first of the plurality of pumping mode radiation sources being disposed adjacent to said external face and oriented to focus a first pumping mode radiation in a direction normal to said external face to avoid pumping mode astigmatism in a waist in said gain medium at said external face in said folded resonator cavity to define an active volume and at least one other of said plurality of pumping mode radiation sources oriented to direct other pumping mode radiation through said at least one internal-fold face of said gain medium to at least partially overlap said first pumping mode radiation in a portion of said active volume in said gain medium.

11. A laser according to claim 10 in which said at least one other of said plurality of pumping mode radiation sources is a pair of said plurality of pumping mode radiation sources located with respect to said at least one other internal-fold face to each respectively direct pumping mode radiation into a different portion of said active volume in said gain medium to at least partially overlap the resonator mode radiation, therein.

12. A laser according to claim 11 in which said output coupler has a radius of curvature to reflect said resonator mode through said active volume in said gain medium and said output coupler is spaced from said gain medium to concentrate said resonator mode at said waist at said external face.

13. A laser according to claim 12 further including:
a second harmonic generating crystal located interposed between said output coupler and said internal face to create a second harmonic conversion.

14. A laser according to claim 13 in which said output coupler is coated HR at both the fundamental and second harmonic wavelengths and second harmonic output generated in both the directions through said second harmonic generating crystal is extracted through an internal fold face.

15. A laser according to claim 12 further including a Q-switch interposed between said output coupler and said internal face to interrupt radiation to generate Q-switched operation.

16. A laser according to claim 12 in which the gain medium has a penta-prism-shaped configuration.

17. A laser according to claim 12 in which the gain medium has a right angle prism-shaped configuration.

18. A laser according to claim 11 in which the gain medium has a penta-prism-shaped configuration.

19. A laser according to claim 11 in which the gain medium has a right angle prism-shaped configuration.

20. An internally folded scalable amplifier comprising:
a gain medium amplifying an input wavelength radiation, said gain medium being provided with an exit face, an entrance face and at least one internal-fold face all disposed with respect to one another to reflect a deviation of said input wavelength radiation in said gain medium, said exit face and said entrance face being antireflective to said input wavelength radiation and said at least one internal-fold face being highly reflective to said input wavelength radiation and highly transmissive to pumping mode radiation, said input wavelength radiation being in a direction normal to said entrance face to avoid input wavelength astigmatism and at least one pumping mode radiation source oriented to direct pumping mode radiation through said at least one internal-fold face into a portion of an active volume in said gain medium to at least partially overlap the pumping mode and said input wavelength radiations therein to effect an amplification due to an inversion of said pumping mode radiation in said gain medium.

21. An amplifier according to claim 20 further including:
an additional source of pumping mode radiation disposed to said exit face oriented to focus pumping mode radiation in a direction normal to said external face and means for separating said pumping mode radiation and the amplified said input wavelength radiation.

22. An amplifier according to claim 20 further including:
a plurality of pumping mode radiation sources each oriented to direct pumping mode radiation through said at least one internal-fold face into a portion of an active volume in said gain medium in a separate said internal path in said gain medium to at least partially overlap the pumping mode and said input wavelength radiations therein to effect an amplification due to an inversion of said pumping mode radiation in said gain medium.

23. An internally folded laser comprising:
a gain medium producing a resonator mode of radiation, said gain medium being provided with an external face, an internal face and at least one internal-fold face all disposed with respect to one another to reflect a 90° deviation of said resonator mode in said gain medium, said internal face being antireflective to resonator mode radiation and said external face and said at least one internal-fold face being highly reflective to resonator mode radiation and highly transmissive to pumping mode radiation;

an output coupler partially reflective of said resonator mode radiation, said output coupler being configured and spaced from said internal face of said gain medium and oriented to receive and reflect said resonator mode radiation in a direction normal to said internal face to define an approximately hemispherically-shaped folded resonator cavity that extends from said output coupler through an active volume in said gain medium to said external face of said gain medium to effect said 90° deviation of said resonator mode therein, said resonator mode radiation being in a direction normal to said internal face of said gain medium to avoid resonator mode astigmatism; and a plurality of sources of pumping mode radiation, a first of the plurality of pumping mode radiation sources being disposed adjacent to said external face and oriented to focus a first pumping mode radiation in a direction normal to said external face to avoid pumping mode astigmatism in a waist in said gain medium inside said external face in said folded resonator cavity to define an active volume and at least one other of said plurality of pumping mode radiation sources oriented to direct other pumping mode radiation through said at least one internal-fold face of said gain medium to at least partially overlap said first pumping mode radiation in a portion of said active volume in said gain medium.

24. A laser according to claim 23 in which said at least one other of said plurality of pumping mode radiation sources is a pair of said plurality of pumping mode radiation sources located with respect to said at least one other internal-fold face to each respectively direct pumping mode radiation into a different portion of said active volume in said gain medium to at least partially overlap the resonator mode radiation therein.

25. A laser according to claim 24 in which said output coupler has a radius of curvature to reflect said resonator mode through said active volume in said gain medium and said output coupler is spaced from said gain medium to concentrate said resonator mode to locate said waist at said external face.

26. A laser according to claim 25 further including:
a second harmonic generating crystal located interposed between said output coupler and said internal face to generate a second harmonic conversion.

27. A laser according to claim 25 further including:
a Q-switch interposed between said output coupler and said internal face to interrupt radiation to generate Q-switched operation.

28. A laser according to claim 25 in which the gain medium has a penta-prism-shaped configuration.

29. A laser according to claim 25 in which the gain medium has a right angle prism-shaped configuration.

30. A laser according to claim 24 in which the gain medium has a penta-prism-shaped configuration.

31. A laser according to claim 24 in which the gain medium has a right angle prism-shaped configuration.

32. An internally folded laser comprising:
a gain medium producing a resonator mode of radiation, said gain medium being provided with an external face, an internal face and at least one internal-fold face all disposed with respect to one another to reflect a deviation of said resonator mode in said gain medium, said internal face being antireflective to resonator mode radiation and said external face and said at least one internal-fold face being highly reflective to resonator mode radiation and highly transmissive to pumping mode radiation;
an output coupler partially reflective of said resonator mode radiation, said output coupler being configured and spaced from said internal face of said gain medium and oriented to receive and reflect said resonator mode radiation in a direction normal to said internal face to define an approximately hemispherically-shaped folded resonator cavity that extends from said output coupler through an active volume in said gain medium to said external face of said gain medium to effect said deviation of said resonator mode therein, said resonator mode radiation being in a direction normal to said internal face of said gain medium to avoid resonator mode astigmatism; and
a plurality of sources of pumping mode radiation, a first of the plurality of pumping mode radiation sources being disposed adjacent to said external face and oriented to focus a first pumping mode radiation in a direction normal to said external face to avoid pumping mode astigmatism in a waist in said gain medium inside said external face in said folded resonator cavity to define an active volume and at least one other of said plurality of pumping mode radiation sources oriented to direct other pumping mode radiation through said at least one internal-fold face of said gain medium to at least partially overlap said first pumping mode radiation in a portion of said active volume in said gain medium.

33. A laser according to claim 32 in which said at least one other of said plurality of pumping mode radiation sources is a pair of said plurality of pumping mode radiation sources located with respect to said at least one other internal-fold face to each respectively direct pumping mode radiation into a different portion of said active volume in said gain medium to at least partially overlap the resonator mode radiation therein.

34. A laser according to claim 33 in which said output coupler has a radius of curvature to reflect said resonator mode through said active volume in said gain medium and said output coupler is spaced from said gain medium to concentrate said resonator mode at said waist at said external face.

35. A laser according to claim 34 further including:
a second harmonic generating crystal located interposed between said output coupler and said internal face to generate second harmonic conversion.

36. A laser according to claim 35 in which said output coupler is coated HR at both the fundamental and second harmonic wavelengths and the second harmonic output generated in both directions through said second harmonic generating crystal is extracted through an internal fold face.

37. A laser according to claim 34 further including a Q-switch interposed between said output coupler and said internal face to interrupt radiation to create Q-switched operation.

38. A laser according to claim 34 in which the gain medium has a penta-prism-shaped configuration.

39. A laser according to claim 34 in which the gain medium has a right angle prism-shaped configuration.

40. A laser according to claim 33 in which the gain medium has a penta-prism-shaped configuration.

41. A laser according to claim 33 in which the gain medium has a right angle prism-shaped configuration.

* * * * *